United States Patent
Bhogal et al.

(10) Patent No.: US 9,864,689 B2
(45) Date of Patent: *Jan. 9, 2018

(54) NEAR CACHE DISTRIBUTION IN IN-MEMORY DATA GRID (IMDG) NON STRUCTURED QUERY LANGUAGE (NO-SQL) ENVIRONMENTS

(71) Applicant: International Business Machines Corporation, Armonk, NY (US)

(72) Inventors: Kulvir S. Bhogal, Fort Worth, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,240

(22) Filed: Aug. 25, 2015

(65) Prior Publication Data

US 2016/0170893 A1 Jun. 16, 2016

Related U.S. Application Data

(63) Continuation of application No. 14/566,277, filed on Dec. 10, 2014.

(51) Int. Cl.
*G06F 12/08* (2016.01)
*G06F 9/455* (2006.01)
(Continued)

(52) U.S. Cl.
CPC ...... *G06F 12/0888* (2013.01); *G06F 9/45504* (2013.01); *G06F 12/0806* (2013.01);
(Continued)

(58) Field of Classification Search
None
See application file for complete search history.

(56) References Cited

U.S. PATENT DOCUMENTS

| 5,933,849 A | 8/1999 | Srbljic et al. |
| 7,509,667 B1 * | 3/2009 | Cook ............... H04N 7/1675 380/200 |

(Continued)

OTHER PUBLICATIONS

List of IBM Patents or Patent Applications Treated as Related dated Nov. 11, 2015, 2 pages.

(Continued)

*Primary Examiner* — Abu Ghaffari
(74) *Attorney, Agent, or Firm* — Scully, Scott, Murphy & Presser, P.C.; Nicholas D. Bowman, Esq.

(57) ABSTRACT

Near cache distribution in in-memory data grid environment that utilizes manifest of keys may be provided. An application instance may be initialized that utilizes an in-memory data grid caching infrastructure with a near cache in a virtual machine running on hardware processor. The near cache for the application instance may be activated. Logic of the near cache associated with the application instance may request a manifest of keys from one or more peer applications utilizing the in-memory data grid caching infrastructure, and receive the manifest of keys. The logic of the near cache associated with the application instance may send the manifest of keys to a grid cache of the in-memory data grid caching infrastructure. The logic of the near cache associated with the application instance may receive at least some of the data objects from the grid cache.

6 Claims, 3 Drawing Sheets

(51) Int. Cl.
  *G06F 12/0888* (2016.01)
  *H04L 29/08* (2006.01)
  *G06F 12/0806* (2016.01)
  *G06F 9/50* (2006.01)
  *G06F 11/30* (2006.01)

(52) U.S. Cl.
  CPC ...... *H04L 67/1097* (2013.01); *H04L 67/2842* (2013.01); *G06F 9/45558* (2013.01); *G06F 9/5072* (2013.01); *G06F 11/3037* (2013.01); *G06F 2212/657* (2013.01)

(56) References Cited

U.S. PATENT DOCUMENTS

| | | | |
|---|---|---|---|
| 7,860,825 B2 | 12/2010 | Chatterjee et al. | |
| 8,230,414 B1 | 7/2012 | Hand et al. | |
| 8,775,657 B2 | 7/2014 | Hudson et al. | |
| 8,849,759 B2 | 9/2014 | Bestler et al. | |
| 2002/0120666 A1 | 8/2002 | Landsman et al. | |
| 2005/0165758 A1 | 7/2005 | Kasten et al. | |
| 2008/0222363 A1* | 9/2008 | Khemani | H04L 63/0485 711/138 |
| 2008/0256298 A1 | 10/2008 | Lu et al. | |
| 2009/0019158 A1* | 1/2009 | Langen | H04L 67/1095 709/226 |
| 2009/0228647 A1 | 9/2009 | Klems et al. | |
| 2010/0011061 A1* | 1/2010 | Hudson | D01D 5/423 709/204 |
| 2011/0082924 A1* | 4/2011 | Gopalakrishnan | H04L 65/4084 709/223 |
| 2011/0188439 A1* | 8/2011 | Mao | H04N 7/17318 370/312 |
| 2011/0246518 A1* | 10/2011 | Mehrotra | H04L 67/2842 707/770 |
| 2011/0264744 A1* | 10/2011 | Twiss | H04L 12/1886 709/204 |
| 2011/0296048 A1* | 12/2011 | Knox | H04L 65/605 709/231 |
| 2012/0158650 A1* | 6/2012 | Andre | G06F 17/30457 707/611 |
| 2012/0303901 A1 | 11/2012 | Chen et al. | |
| 2012/0311020 A1* | 12/2012 | Brown | G06F 12/0862 709/203 |
| 2013/0013844 A1 | 1/2013 | Venkatesh et al. | |
| 2013/0019000 A1* | 1/2013 | Markus | G06F 9/466 709/223 |
| 2013/0041943 A1* | 2/2013 | Ozawa | H04W 4/021 709/203 |
| 2013/0086326 A1* | 4/2013 | Revanuru | G06F 12/0842 711/122 |
| 2013/0198249 A1 | 8/2013 | Hoang et al. | |
| 2013/0239004 A1* | 9/2013 | Bihani | H04L 67/10 715/734 |
| 2013/0246932 A1* | 9/2013 | Zaveri | G06F 3/017 715/740 |
| 2013/0305039 A1* | 11/2013 | Gauda | G06F 21/6218 713/153 |
| 2014/0122637 A1* | 5/2014 | Wan | H04L 67/2842 709/213 |
| 2014/0156805 A1* | 6/2014 | Gomes | H04L 67/06 709/219 |
| 2014/0330767 A1* | 11/2014 | Fowler | G06F 9/466 707/607 |
| 2015/0074222 A1* | 3/2015 | Liang | H04L 67/2842 709/214 |
| 2015/0120821 A1* | 4/2015 | Bendell | H04L 67/2842 709/203 |
| 2015/0169610 A1 | 6/2015 | Lee et al. | |
| 2015/0178226 A1 | 6/2015 | Scarlata et al. | |
| 2015/0199278 A1 | 7/2015 | Fioravanti | |
| 2015/0381755 A1* | 12/2015 | Li | H04L 67/2842 709/214 |
| 2016/0065673 A1 | 3/2016 | Mehra | |
| 2016/0127440 A1 | 5/2016 | Gordon | |
| 2016/0149882 A1* | 5/2016 | Srivastava | H04L 67/02 726/4 |

OTHER PUBLICATIONS

"WebSphere eXtreme Scale overview", printed on Oct. 23, 2014, 3 pages.
"Caching concepts", printed on Oct. 23, 2014, 29 pages.
Office Action dated Apr. 18, 2016 received in parent U.S. Appl. No. 14/566,277, 17 pages.
Office Action dated Sep. 20, 2016 received in U.S. Appl. No. 14/566,277.
Office Action dated Jan. 12, 2017 received in parent U.S. Appl. No. 14/566,277, 16 pages.
Wang, W., et al.," EasyCache: A Transparent In-Memory Data Caching Approach for Internetware", ACM, Internetware' 14, Nov. 17, 2014, pp. 35-44.

\* cited by examiner

NEAR CACHE DISTRIBUTION IN IN-MEMORY DATA GRID (IMDG) NON STRUCTURED QUERY LANGUAGE (NO-SQL) ENVIRONMENTS

FIELD

The present application relates generally to computers, and computer applications, and more particularly to near cache distribution in in-memory data grid (NO-SQL) environments.

BACKGROUND

To speed up application performance, techniques have been employed that cache data at various tiers in application infrastructure, for example, including edge, ultra edge, data grid and near cache. Other techniques like cache optimization on server side that use predictive cache load from back end databases based on pattern of data access have also been employed. Replication, snapshots and vMotion like VM movement are some other techniques used to improve the speed of virtual machine (VM) instance provisioning.

BRIEF SUMMARY

A method and system of near cache distribution, for example, in in-memory data grid (IMDG) environment may be provided. The method, in one aspect, may comprise initiating an application instance that utilizes an in-memory data grid caching infrastructure with a near cache in a virtual machine running on hardware processor. The method may further comprise activating the near cache for the application instance on the virtual machine. The method may also comprise requesting, by logic of the near cache associated with the application instance from one or more peer application servers utilizing the in-memory data grid caching infrastructure, a manifest of keys, the keys associated with data objects. The method may also comprise receiving, by the logic of the near cache associated with the application instance the manifest of keys. The method may further comprise sending, by the logic of the near cache associated with the application instance, the manifest of keys to a grid cache of the in-memory data grid caching infrastructure. The method may further comprise receiving, by the logic of the near cache associated with the application instance, at least some of the data objects from the grid cache.

A system for near cache distribution, for example, in in-memory data grid (IMDG) environment, in one aspect, may comprise an application server operable to run as a member of a cluster of application servers utilizing an in-memory data grid caching infrastructure, at least some of the application servers for running application instances of the same application. A near cache may be provided comprising logic and allocated memory in the application server. A manifest file associated with the application server may be provided. Responsive to initiating an application instance hosted on the application server, the near cache may be activated for the application instance. The application server may be operable to request a manifest of keys from one or more peer application servers in the cluster utilizing the in-memory data grid caching infrastructure, the keys associated with data objects. The application server may be further operable to receive the manifest of keys and send the manifest of keys to a grid cache of the in-memory data grid caching infrastructure. The application server may be further operable to receive at least some of the data objects from the grid cache.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A grid generally includes loosely coupled computers that function together to run tasks. In-Memory Data Grid (IMDG) refers to a data store that uses main memory, for example, random access memory (RAM) as a storage area. IMDG data may be distributed and stored across multiple servers, e.g., in a grid manner using caches of those servers to store data. The data model of IMDG is usually object-oriented or object-based, and data in IMDG may be accessed using a key/value pair pattern.

In multi-tenant or multi-tenancy environment, a single instance of application or software runs on a server and services multiple groups of users (tenants). For instance, multiple users who do not see or share each other's data can share the same application (the same instance of software) running on the same operating system, using the same hardware and the same data storage mechanism.

A methodology and/or system are disclosed that improves application performance in applications utilizing in-memory data grid, for example, in application environments such as multi-tenancy environment. The methodology allows for an application running on an application server to be aware of the types of requests its peers are serving, and to proactively request such types of requests from a source peer and/or from an in-memory data grid. For instance, when an application is started in a clustered virtual machine set up such as the Java™ Virtual Machine (JVM) setup, it may be beneficial to the application to know, from other instances of the same application in the cluster that were started before it, what objects it will need to operate. A cluster is a collection of servers, which may include hardware, software (e.g., application servers) and/or virtual machines such as JVMs that communicate with each other to perform group services, for example, providing high availability and failover mechanisms. Clustered JVM setup refers to a collection of JVMs, for example, running one or more applications. The methodology of the present disclosure in one embodiment may be utilized as an intelligent optimization on an IMDG client side to disseminate metadata on requested object to the peer servers and also to make a single request to data grid that can send the needed object to the peer cluster members. An application server or JVM that requests data in IMDG infrastructure are considered to be an IMDG client; an IMDG server of the IMDG infrastructure services or provides the requested data from grid caches of IMDG to IMDG clients.

In one embodiment of the present disclosure, a manifest is developed and utilized that allow applications running, for example, on application servers (e.g., virtual machines or JVMs) to be aware and to participate in polling for expressing interest and proactive need of data in near cache or local cache. Briefly, near cache schema includes cache local to the application serving as a cache for server-side cache.

In one aspect, the methodology of the present disclosure may increase and induce application awareness between peer application servers, for example, enable an efficient mechanism of surgical distribution of like data in near cache for improved application performance, and also provide a mechanism or apparatus to on-board new applications (e.g., JVMs), e.g., in a multi-tenant cloud environment.

Briefly, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models. Examples of the service models include Software as a Service (SaaS) and Platform as a Service (PaaS) service models. In Software as a Service (SaaS) service model, the consumer may be provided the capability to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. In Platform as a Service (PaaS), the consumer may be provided the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Those are some examples of cloud service models to which a methodology of the present disclosure in one embodiment may apply.

A cloud computing environment is usually service oriented with a focus on statelessness, low coupling, modularity, and semantic interoperability. At the heart of cloud computing is an infrastructure comprising a network of interconnected nodes. It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

Figure 1:
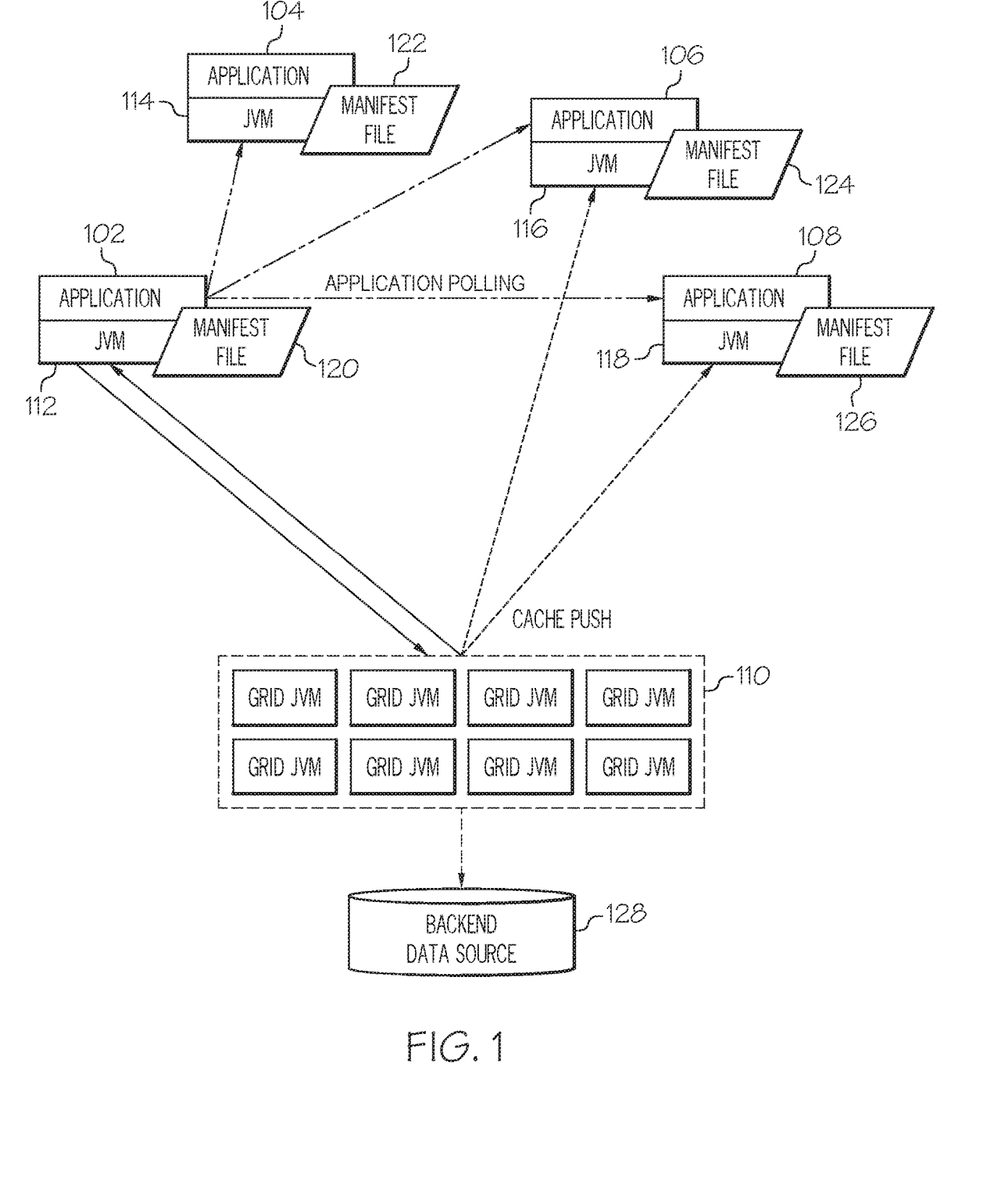
FIG. 1 is a diagram illustrating near cache distribution in IMDG environment in one embodiment of the present disclosure.

FIG. 1 is a diagram illustrating near cache distribution in IMDG environment in one embodiment of the present disclosure. When an application is started in a clustered JVM setup, it can benefit from knowing from other instances of the same application in the cluster that were started before it, what objects the application will need to operate. The application may broadcast its need for an object to their peer applications in a cluster. For instance, applications that are running are primed with cached data. A new application server may start and join the cluster of application servers running the applications, for example, to help in load balancing. The new application server, however, may not be primed with the data objects it may need to run. Based on an application that may start or run on the new application server that joined the cluster, a cache manifest of the present disclosure in one embodiment may assist in asserting interest in cached data objects, and receiving the cached data objects from one or more data grid servers that host the cached data objects. In one embodiment, one request may be made and the in-memory data grid may disseminate the needed object to the cluster members (e.g., the applications on the cluster members) that will need the same object. For example, applications 102, 104, 106, 108 are running in virtual machines 112, 114, 116, 118, as part of a virtual machine cluster. In one embodiment of the present disclosure, a manifest (120, 122, 124, 126) may be provided for each of the application servers (112, 114, 116, 118). A manifest is also referred to as a manifest file, and maps an application, a given set of objects that the application needs, and application servers or JVMs interested in the set of objects or requesting the set of objects.

Since an application might not know if it will need an object, the manifest files may be synchronized among the cluster members (112, 114, 116, 118). For instance, when a new cluster member (e.g., a new application server) 112 joins a cluster of application servers 114, 116, 118, the new cluster member 112 may initiate a polling process as part of group services, requesting a copy of a current manifest file (e.g., one or more of 122, 124, 126) from one or more peer servers 114, 116, 118 in the cluster. Based on the application or applications 102 hosted by the new cluster member, the new cluster member may identify the data objects it is interested in from the data objects listed in the current manifest file received from one or more peer servers 114, 116, 118. For example, the manifest file 122 may indicate that the application server 114 is hosting one or more of the same or similar application as the application server at 112, and therefore, the application server 112 may need some or all of the objects listed in the manifest file of the application server at 114. The new cluster member 112 updates its manifest file 120 to include the identified data objects that it is interested in. The new cluster member 112 may send its manifest file 120 to one or more IMDG servers (e.g., comprising 110 and 128). For example, a manifest file 122 associated with application server 114 may include a number of data objects its application 104 has used while operating or running. Another application server 102 may start up, but its manifest file 120 may be empty. The content of the manifest file at 122 may be copied to the manifest file at 120, for example, if it is determined that the applications 102 and 104 are running the same software and, for example, it may be assumed that the application at 102 will use the same data objects as the application at 104. Other methods may be used to synchronize the manifest file of a newly started application server with those of the peer application servers. For instance, selective contents of one or more manifest files (e.g., 122, 124, 126) of respective one or more peer application servers (e.g., 114, 116, 118) may be copied to the manifest file (e.g., 120) of the new cluster member, for example, based on what applications in common are hosted by the servers in the cluster. It is noted that application servers may host other applications as well.

In FIG. 1, an application server tier (e.g., 102, 104, 106, 108), e.g., in a multi-tenant environment, may include many virtual machines (VM, e.g., JVMs) in a data center environment with many application. The virtual machines (e.g., JVMs shown e.g., at 112, 114, 116, 118) may serve as application servers. The virtual machines or application servers may be started on a computer and the applications may be started to run on the virtual machines. This may provide cloud infrastructure or data centers the flexibility to have everything everywhere and enable on-demand start up of applications, for example, based on demand and failures. Each application running on virtual machines or application servers (e.g., JVMs) occupy some VM real estate in form of memory consumption. This memory consumption can be due to normal application class that are loaded on start up or caching requirements to enhance performance.

Applications may also talk to an intermediary tier like a NoSQL databases such as In Memory Data Grid 110 to improve time on backend data access. IMDG keeps the objects which save time on in memory access and raw data into object conversion. In Memory Data Grid 110 comprises data used by the applications (e.g., 102, 104, 106, 108). A Grid JVM may hold application data for the grid. For instance, each Grid JVM may store a portion of data used by the application (e.g., 102, 104, 106, 108). Grid JVMs include a set of interconnected java processes that holds the data in memory, for example, acting as shock absorbers to the back end databases 128. This not only enabled faster data access, as the data is accessed from memory, but also reduces the stress on database 128. Grid JVMs may be allocated in different JVM or hardware from the application servers (e.g., 112, 114, 116, 118). Grid JVMs 110 hosting data objects may be located on one or more physical machines or hardware. For instance, there may be one or several JVMs on a single physical machine and there may be many physical machines or hardware that form a grid 110. Similarly, application servers 112, 114, 116, 118 may be JVMs on one physical machine or distributed across many physical machines.

Application Servers (e.g., 112, 114, 116, 118) use a communication system for singleton services, for example, for health and heartbeat singleton services. For instance, in a singleton service, multiple clients are independently connected to the same single instance of a server application.

In the present disclosure in one embodiment, the same communication network established by the application server peers may be utilized to synchronize a manifest or manifest file, e.g., also referred to as "near cache object manifest file" (e.g., 120, 122, 124, 126). A manifest file may be stored in near cache of an application server. This near cache object manifest file may be utilized among the cluster peers 102, 104, 106, 108 and function as a map that allows for application servers or JVMs 112, 114, 116, 118 to participate in polling for expressing interest and proactive need of data in their respective near cache. For example, one or more application servers in the cluster that are hosting the same application are identified and the data objects cached in those application servers are identified.

A manifest file may contain the identification of data objects, identification of the applications that might need those data objects, and identification of application servers that are interested in getting those data objects. Manifest files (e.g., 120, 122, 124, 126) associated with respective application servers may be synchronized as part of group services functionality. A manifest file may be updated based on membership changes, for example, a new JVM being added, existing JVM being deleted, a new application being instantiated on a JVM. An example manifest file may contain the following:

Cache/Data Object:
abc
xyz
Application:
123
456
Client Interested in the Data Object:
AppServer 1
AppServer 2

After the polling, a list of application servers, which have expressed an interest is tagged with the initial object request, e.g., specified in the manifest file, and the manifest file is sent to the IMDB server, e.g., grid JVM 110. IMDB server side may also include backend data 128. Backend data 128 comprises persistent data in raw format, for example, stored in persistent data storage such as storage disks, and backs the grid JVMs stored in memory.

Upon receipt of the request and list of peer servers, the in memory data base servers 110 may send the same object to application server JVMs in the list tagged with the request. This methodology in one embodiment may reduce communications by every application server, for instance, because only one request informs the data grid 110 of interested JVMs (e.g., one or more of 112, 114, 116, 118).

The following describes an example of initial peer startup or warmup process in one embodiment of the present disclose. A peer or peer application server in the present disclosure refers to a cluster member which has same application and participates in the application serving process. A peer can include both a server and a client: the server which is the IMDG server and the client which is the application server requesting the cached objects for near cache. A peer application refers to an application running on a peer application server.

A new clustered, peer application instance (e.g., 102), which utilizes an IMDG caching infrastructure with a local or near cache may be started. When the local/near IMDG cache is activated for the new application instance, it may request a manifest of keys from one or more other peer local/near cache IMDG instances. Local or near IMDG cache is part of in memory application cache or application server JVM (e.g., 112) that is requesting cached data from IMDG server(s). The new local/near IMDG cache may proactively send the manifest of keys to the IMDG server for fulfillment. The data is sent to the application instance's near/local IMDG cache, for example, using getAll(keys) or another sync mechanism. The peer application is activated and "warmed-up" with cached data.

The following describes and example scenario for runtime maintenance of peer caches and key manifest. A near/local cache of an application server (e.g., 112) receives a request for key A, for example, from an application (e.g., 102) that it is hosting. The requested data does not exist in the near cache of the application (e.g., 102), e.g., in the application server (e.g., 112). The near/local cache (e.g., 112) broadcasts an asynchronous request to all peer near cache instances (e.g., 114, 116, 118) that A was requested and it does not have it. The near/local cache may update the key manifest (e.g., 120) to add a new cache object request if it is not already there. The near/local cache receives object for A, for example, from the IMDG server. A peer near/local cache receives the broadcast for object A and checks to determine if it has A. If it does not, it fetches it from the grid, for example, by sending a synchronized manifest file to the IMDG server. The IMDG server sends the requested object to the application servers listed in the manifest file (tagged application servers). After fetching, the peer application server keeps the object in near cache for future requests and updates the manifest file, for example, adds object A to its manifest file.

In the present disclosure, applications running on virtual machines or servers in in-memory data base cache tier, e.g., JVMs in IMDG context, communicate with themselves and provide a manifest of interested parties (servers) data that may be needed by the peer servers, e.g., to be proactively loaded in near cache by the IMDG cache tier or cache servers that hold the master data. Near cache is located in application server that hosts the application and far cache (or master data) is located in grid JVMs or a set of IMDG servers.

The methodology of the present disclosure in one embodiment may optimize performance by reducing the number of connections between Application JVMs (application running on an application server, e.g., JVM) and IMDG cache service (IMDG server) and speeding up the understanding of application server cache requirements.

Figure 2:
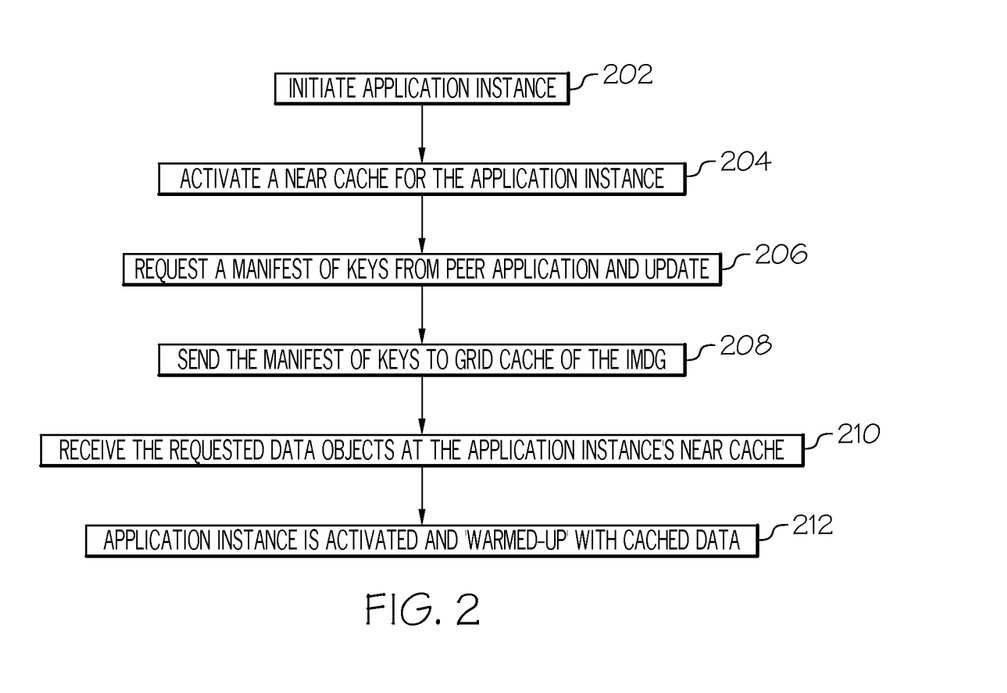
FIG. 2 is a flow diagram illustrating a method of near cache distribution in one embodiment of the present disclosure.

FIG. 2 is a flow diagram illustrating a method of near cache distribution in one embodiment of the present disclosure. At 202, an application instance is initiated that utilizes an in-memory data grid caching infrastructure with a near cache. It may be that a new application instance is started on an existing JVM or a new JVM started and the application instance started with the new JVM. At 204, a near cache is activated for the application instance. For instance, a decision to cache the objects in the JVM running the application instance is made. For example, cache is allocated in the JVM hosting the application instance for the application instance.

At 206, a logic of the near cache associated with the application instance requests a manifest of keys from one or more other peer near cache instances. For example, each application server in the peer group may include a near cache logic and allocated cache memory. Each application server in the peer group also may include a manifest of keys associated with data objects the application instance may need to operate or will be using, e.g., because the peer applications may be instances of the same application. The logic of the initiated application instance's near cache, for example, receives from one or more peer application server's near cache logic, the data object keys. The logic of the initiated application instance's near cache, for example, updates the manifest of keys to include or add this application server or virtual machine to a list of one or more peer application servers listed in the manifest of keys to indicate this virtual machine's interest in one or more data objects specified in the manifest of keys. For instance, the virtual machine is tagged in the manifest of keys. Each application server's manifest of keys may be synchronized. Synchronization may be part of group services provided for the peer group, and may be performed periodically or at the time one of the application servers makes an update to its respective manifest of keys. In this way, application servers may express interest in cached object (e.g., those that are most widely used and pertinent to the application hosted) being populated by IMDG or far cache or NO SQL data store (which is also a cache frontend having a persistent data store like DB2). This mechanism not only makes cache population surgical, intelligent but also dynamic.

At 208, the application instance's near cache logic sends manifest of keys it received from peer applications to grid cache of the IMDG for fulfillment.

The grid cache may send the requested data objects to the application instance's near cache, and at 210, the requested data objects may be received at the application instance's near cache. In one aspect, all of the data objects specified by data object keys in the manifest file tagged as being of interest to this application instance (or application server running this application instance) are received at the near cache from the grid cache. In another aspect, some of the data objects that the application instance will be using may be found in near cache of one or more of the peer applications. In that case, the data objects may be received from the peer application directly, and the data objects not in the near caches of the peer applications may be received from the grid cache.

At 212, the application instance is activated and 'warmed-up' with cached data, which for example, the application may need when operating.

Figure 3:
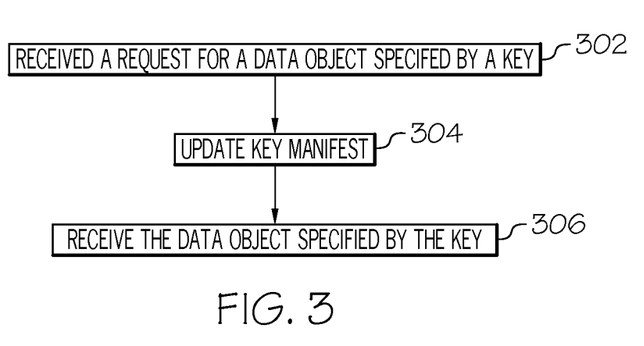
FIG. 3 is a flow diagram illustrating a process of maintaining peer caches and key manifests in one embodiment of the present disclosure.

FIG. 3 is a flow diagram illustrating a process of maintaining peer caches and key manifests in one embodiment of the present disclosure. At 302, near or local cache receives a request for a data object specified by a key. If this near cache does not have this data object, the logic of the near cache may broadcast an asynchronous request to all peer cache instances that this data object specified by the key was requested and that it does not have it. At 304, the near cache updates its key manifest, e.g., manifest file, to include this key. At 306, the near cache receives the data object specified by the key. For instance, the data object may be received from a peer near cache that has the data object. If no peer near caches have the data object, one of the peer near caches may fetch the data object from the grid cache. The manifest files associated with the respective peer near caches may be updated.

Figure 4:
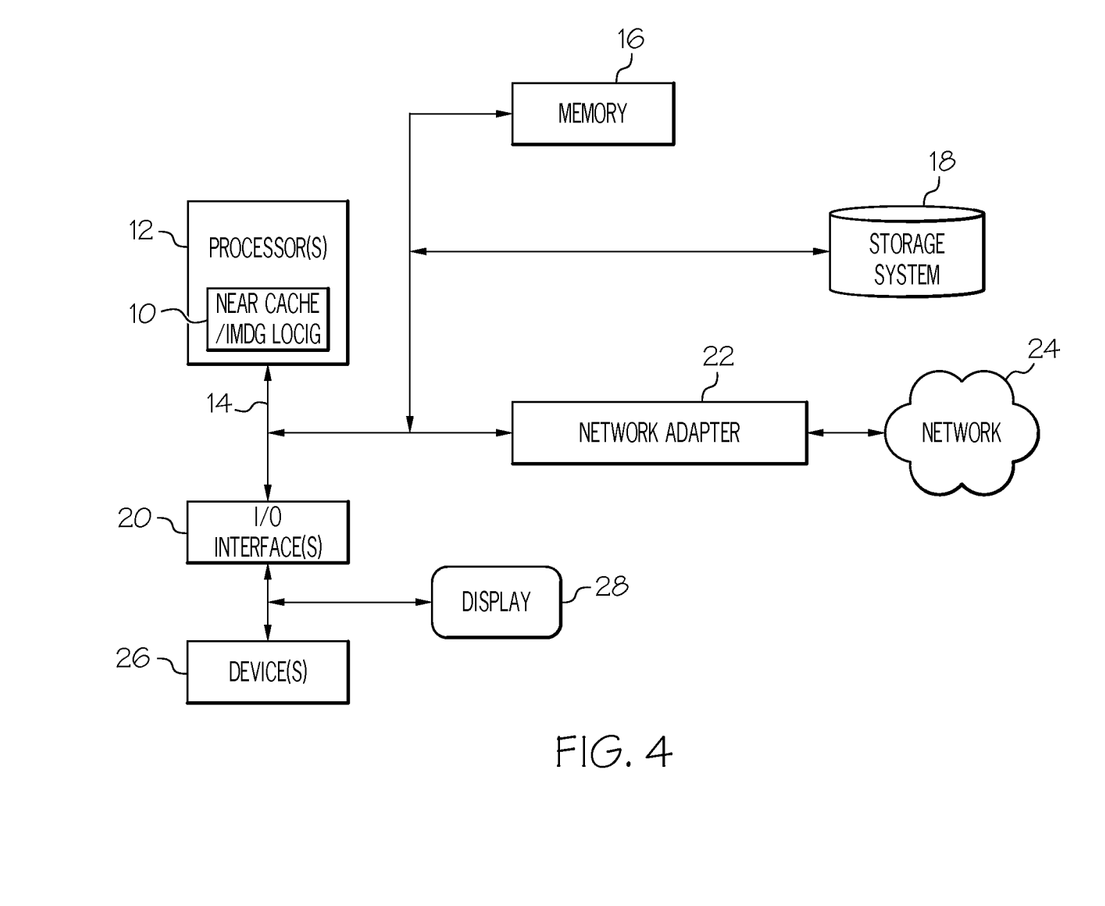
FIG. 4 illustrates a schematic of an example computer or processing system that may implement a near cache distribution system in one embodiment of the present disclosure.

FIG. 4 illustrates a schematic of an example computer or processing system that may implement the a near cache distribution system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of near cache distribution, comprising:

initiating an application instance of an application with a near cache in a virtual machine running on hardware processor, the application that utilizes an in-memory data grid caching infrastructure comprising one or more in-memory data grid servers;

activating the near cache for the application instance on the virtual machine;

requesting a manifest of keys from one or more peer application servers utilizing the in-memory data grid caching infrastructure, the requesting performed by a logic of the near cache associated with the application instance, the keys associated with data objects, the one or more peer application servers being different from the virtual machine executing the application instance and different from the one or more in-memory data grid servers, wherein the virtual machine and the one or more peer application servers are part of a cluster of application servers, the at least one peer application being another instance of the application that started on the different application server before the application instance and operating on the data objects needed by the application instance, the different application server running on another virtual machine different from the virtual machine;

receiving, by the logic of the near cache associated with the application instance the manifest of keys;

updating, by the logic of the near cache associated with the application instance, the manifest of keys to add the virtual machine to a list of one or more peer application servers listed in the manifest of keys to indicate the virtual machine's interest in one or more data objects specified in the manifest of keys;

sending, by the logic of the near cache associated with the application instance, the manifest of keys to a grid cache of the in-memory data grid caching infrastructure; and receiving, by the logic of the near cache associated with the application instance, at least one of the data objects specified in the manifest of keys from the grid cache, wherein the manifest of keys is synchronized among the virtual machine and said one or more peer application servers, wherein a manifest file stores, in the near cache, a mapping of a given application, a given set of objects the given application needs, and given application servers requesting at least one of the given set of objects, wherein the manifest file comprises the manifest of keys that is received.

2. The method of claim 1, further comprising:

receiving at least one of the data objects from said one or more peer application servers' near cache.

3. The method of claim 1, further comprising:
receiving a request for a data object from the application instance by the virtual machine; and
broadcasting the request for the data object specified by a key to said one or more peer applications.

4. The method of claim 1, wherein the application instance and the peer applications each have the manifest of keys listing at least data object to key mappings.

5. The method of claim 4, wherein the manifest of keys further comprises a list of applications using the data object, a list of virtual machines interested in the data object.

6. The method of claim 5, wherein responsive to the sending the manifest of keys to the grid cache of the in-memory data grid caching infrastructure by the logic of the near cache associated with the application instance, said one or more peer applications automatically receive the at least one of the data objects.

* * * * *